(12) United States Patent
Witzgall

(10) Patent No.: US 7,595,771 B1
(45) Date of Patent: Sep. 29, 2009

(54) ELECTRO-OPTICAL, TUNABLE, BROADBAND COLOR MODULATOR

(75) Inventor: Hanna E. Witzgall, Arlington, VA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/469,070

(22) Filed: Dec. 21, 1999

Related U.S. Application Data

(60) Provisional application No. 60/114,562, filed on Dec. 31, 1998.

(51) Int. Cl.
G09G 3/00 (2006.01)
(52) U.S. Cl. .......................................................... 345/32
(58) Field of Classification Search ............ 348/210.99, 348/223.1, 75.7, 758, 760, 761, 224.1, 225.1; 359/245, 246, 26.7, 639, 640; 345/4.3, 40, 345/88, 94, 103, 32, 72, 84, 697; 349/106, 349/107; 353/20
See application file for complete search history.

(56) References Cited

U.S. PATENT DOCUMENTS

| | | | | |
|---|---|---|---|---|
| 4,807,976 A | * | 2/1989 | Little et al. | 350/355 |
| 5,426,447 A | * | 6/1995 | Lee | 345/103 |
| 5,451,980 A | * | 9/1995 | Simon et al. | 345/88 |
| 5,486,878 A | * | 1/1996 | Negishi et al. | 348/757 |
| 5,565,933 A | | 10/1996 | Reinsch | 348/742 |
| 5,570,139 A | * | 10/1996 | Wang | 348/744 |
| 5,650,832 A | * | 7/1997 | Poradish et al. | 348/743 |
| 5,751,384 A | | 5/1998 | Sharp | 349/18 |
| 5,822,021 A | | 10/1998 | Johnson et al. | 348/742 |
| 5,992,320 A | * | 11/1999 | Kosaka et al. | 101/401.1 |
| 6,025,898 A | * | 2/2000 | Kashiwazaki et al. | 349/106 |
| 6,049,364 A | * | 4/2000 | Takahara et al. | 349/10 |
| 6,064,460 A | * | 5/2000 | Ohta et al. | 349/141 |
| 6,232,717 B1 | * | 5/2001 | Oida et al. | 313/586 |

(Continued)

FOREIGN PATENT DOCUMENTS

JP 10-221710 * 8/1998

(Continued)

OTHER PUBLICATIONS

U.S. Appl. No. 09/085,971, filed May 27, 1998, Florence et al.

*Primary Examiner*—Abbas I Abdulselam
(74) *Attorney, Agent, or Firm*—Charles A. Brill; Wade James Brady, III; Frederick J. Telecky, Jr.

(57) ABSTRACT

A display system for creating a full-color projected image. Light from a white light source passes through a color modulator (106). The color modulator (106) is a stack of at least two dielectric layers exposed to an electric field. The applied electric field operates to change the index of refraction of the dielectric material enough to cause the stack of dielectric layers to selectively reflect or transmit various wavelength bands. By changing the electric field, the color modulator (106) provides a series of three primary color light beams that are modulated by a spatial light modulator (112). A controller (128) controls the operation of the spatial light modulator (112) to form an image bearing beam of primary colored light. The image bearing beam of light is focused onto an image plane by a projection optics (124).

7 Claims, 2 Drawing Sheets

U.S. PATENT DOCUMENTS

| | | | |
|---|---|---|---|
| 6,252,638 B1 * | 6/2001 | Johnson et al. | 349/5 |
| 6,255,131 B1 * | 7/2001 | Mori et al. | 438/30 |
| 6,306,509 B2 * | 10/2001 | Takeuchi et al. | 428/425.8 |
| 6,309,073 B1 * | 10/2001 | Nakayama et al. | 353/38 |
| 6,330,039 B2 * | 12/2001 | Matsui et al. | 348/742 |
| 6,342,960 B1 * | 1/2002 | McCullough | 398/79 |
| 6,492,065 B2 * | 12/2002 | Nakagaki et al. | 430/2 |

FOREIGN PATENT DOCUMENTS

JP  10-241573  *  9/1998

* cited by examiner

ELECTRO-OPTICAL, TUNABLE, BROADBAND COLOR MODULATOR

This application claims priority under 35 USC § 119(e)(1) of provisional application No. 60/114,562 filed Dec. 31, 1998.

FIELD OF THE INVENTION

This invention relates to the field of display systems, more particularly to electrically controllable color filters for sequential color display systems.

BACKGROUND OF THE INVENTION

There is a great demand for portable display systems that can project the output of a portable computer to an audience in a small conference room. The ideal portable display system is small, lightweight, inexpensive, quiet, and able to project a very bright image onto a relatively large screen. Designing a successful projector requires tradeoffs between several of these characteristics.

Digital micromirror devices (DMD™) are an ideal spatial light modulator (SLM) for portable display projectors. The digital nature of the DMD provides excellent immunity to electrical noise in the projector circuitry. The extremely fast response time of a DMD enables DMD-based display systems to use pulse width modulation techniques to create intermediate intensity levels.

Color images can be formed simultaneously by three SLMs, each providing a monochromatic image that is combined with the output from the other SLMs to create a full-color image. Alternatively, color images are created by sequentially producing three single-color images with a single SLM. The three single color images are created using a white light source in combination with a spinning color wheel.

The color wheel typically holds three filters, one for each of the three primary colors. A motor drives the color wheel to temporally divide the beam of white light from the light source into three sequential single-color light beams. The motor driving the color wheel is synchronized with the operation of the SLM so that primary color data is driven to the SLM when the proper color filter is in the light path.

The use of a color wheel eliminates the need for three SLMs. Using only one SLM reduces the cost of a display system and eliminates the complex task of optically aligning three SLMs. The use of a single SLM, however, requires the use of a motor and color wheel as well as circuitry to synchronize the color wheel with the SLM. Furthermore, the use of a color wheel increases the size and power consumption of the projector.

As portable projectors continue to improve, consumers expect the size and power consumption of portable projectors to fall further. These expectations eventually become impossible to meet with a color-wheel based system. What is needed is a system and method for creating a full-color image using a single SLM without a moving filter apparatus such as a color wheel or drum.

SUMMARY OF THE INVENTION

Objects and advantages will be obvious, and will in part appear hereinafter and will be accomplished by the present invention which provides an electro-optical, tunable, broadband color modulator suitable for use as a switchable color filter in a projection display system. According to one embodiment of the present invention, a color display system is provided, the display system comprises a light source, at least one color modulator, a controller, a spatial light modulator, and projection optics. The color modulator is comprised of a stack of dielectric layers and transparent electrodes, wherein a voltage applied to the electrodes limits the wavelengths of light permitted to continue on the light path. The color filter, as well as the spatial light modulator, operates in either a reflective or a transmissive mode. According to various embodiments of the disclosed invention, the color modulator is formed on another optical device such as the spatial light modulator or a prism assembly.

According to another embodiment of the disclosed invention, a color modulator is provided. The color modulator is comprised of a substrate, and alternating layers of electrodes and dielectric materials. Voltages applied to the electrodes of the color modulator are operable to filter an incident white light beam into a light beam of one of three primary colors. The electro-optical (EO) dielectric materials are selected for their high EI coefficients and are typically selected from the group consisting of, $LiNbO_3$, $LiTaO_3$, $NH_4H_2PO_4$, $KH_2PO_4$, and CdTe, and the electrodes are typically formed of Indium Tin Oxide.

According to yet another embodiment of the disclosed invention, a method of creating a full-color image is provided. The method comprising the steps of providing a beam of white light filtering the beam of white light to produce a primary color beam of light, selectively modulating portions of the primary color beam, and focusing the selectively modulated primary color beam of light onto an image plane. The filtering step is performed by passing said beam of white light through a stack of at least two dielectric layers, at least one of the dielectric layers exposed to an electric field.

The disclosed color modulator provides a very convenient method of filtering light in a projection display. The electro-optical color modulator replaces the color filter wheel and motor and therefore reduces the size, weight, noise, and power of a projection display system using the new color modulator.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

Figure 1:
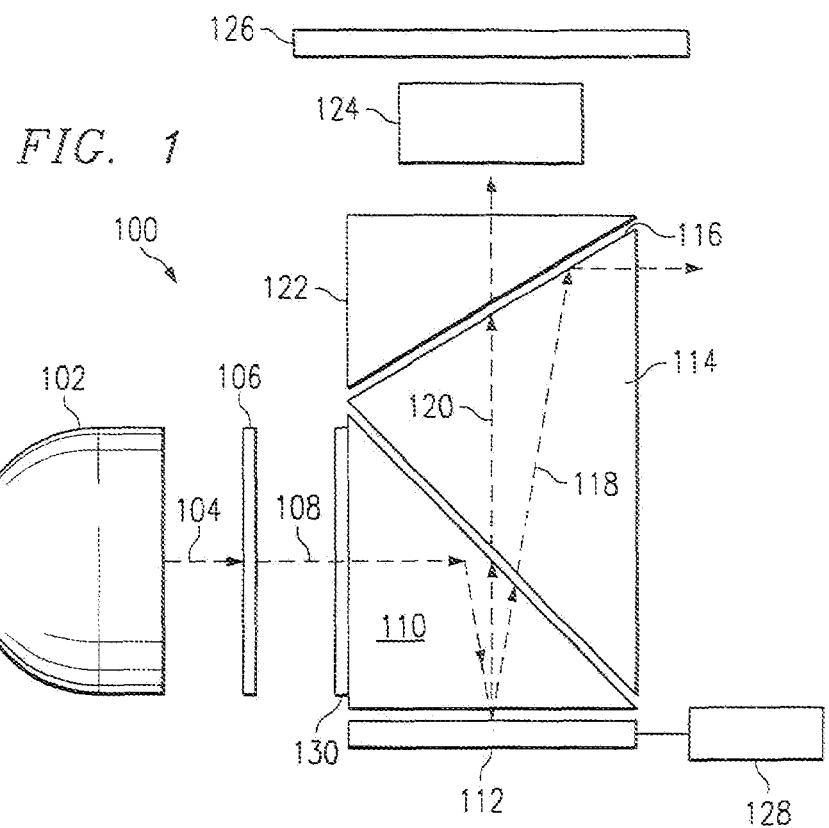
FIG. 1 is a schematic view of a simple single-modulator display system using a color modulator according to the present invention.

A new method of temporally dividing the beam of white light into three sequential single color light beams is shown in FIG. 1. In FIG. 1 a simple single modulator projection display system 100 is shown. Light source 102 produces a beam of white light 104 that strikes the new electro-optical, tunable, broadband color modulator 106 described herein. The beam of white light 104 is filtered by the color modulator 106 to produce a single-color beam of light 108. The single-color beam of light 108 enters a first prism 110. The single-color beam of light passes through the first prism 110 and strikes an angled face of the first prism 110 at an angle that causes the single-color beam of light to be totally reflected by the prism face. The reflected beam of light exits a third face of the prism 110 before striking the spatial light modulator 112, shown as a digital micromirror device.

The angle at which the single-color light beam 108 strikes the DMD is carefully controlled to ensure only the desired portions of the light beam are transmitted to the image plane. The mirrors on a typical DMD are designed to rotate 10° in either direction about a torsion beam hinge axis in response to signals from controller 128. The light beam provided to the DMD is positioned to strike the DMD at an angle equal to twice the rotation of the mirrors. Thus, the incident light beam is positioned 20° from normal in a first direction of rotation.

Mirrors rotated in the first ("on") direction reflect light normal to the plane of the DMD array to an image plane where the reflected light produces a bright image pixel. Mirrors rotated in the other direction, called the "off" direction since the mirrors rotated in the off direction create dark image pixels, reflect light 40° from normal in a second direction. Light from both the on and off mirrors reenters the first prism 110 and strikes the angled face of the first prism at an angle greater than the critical angle. Since the angle of incidence is greater than the critical angle both the on and off light beams pass through the angled face of the first prism 110 and enter a second prism 114 after passing through an air gap between the first and second prisms.

The second prism performs one of two functions. The typical second prism is a compensation prism that equalizes the optical path of light passing through various sections of the prism assembly. When performing the compensation function, the second face 116 of the second prism 114 is parallel to the plane of the SLM 112. The prism shown in FIG. 1 performs the additional function of spatially separating the "on" and "off" light beams in a manner similar to that used by the first prism 110 to separate the incident and reflected light beams. As shown in FIG. 1, the "off" light beam 118 strikes the second surface 116 of the second prism 114 at an angle greater than the critical angle, causing the off beam 118 to be reflected by the interface of the second face 116 of the second prism 114 and an air gap. The reflected off beam 118 exits the second prism 114 through a third face of the second prism 114.

Meanwhile, the on beam of light 120 passes through the second face 116 of the second prism 114 and enters a third prism 122. The third prism 122 performs the compensation function typically performed by the second prism—equalizing the optical distance for all portions of the on beam. Light exiting the third prism 122 passes through a projection lens 124 and strikes an image plane such as projection screen 126.

The current method of color modulation requires the use of a color wheel. The color wheel is comprised of three primary color filters mounted on a disk and rotated to temporally divide the source light into the primary colors. Assuming the use of dichroic color filters, the filters are comprised of alternating layers of high and low indices of refraction and varying thickness. The combination of thickness and refractive index of the different layers controls the pass band of the filter. In the current method of color modulation, the thickness and refractive index of the material are fixed.

This invention proposes electro-optically changing the color filter's pass band. By applying a voltage across an electro-optical material, the refractive index of the material is altered. An estimate of how much the color filter's passband edge will change for a given change in index is given by the equation below.

$$\delta\lambda = \frac{\delta\eta}{\eta}\cdot\lambda$$

The applied voltage controls the magnitude of the change in the index of refraction according to the following relationship, which is an approximation based on a Taylor series expansion:

$$\delta n = \frac{1}{2}\cdot n^3 r\frac{V}{d}$$

where n is the refractive index, r is the electro-optica coefficient, and V is the voltage applied across the layer of thickness d.

In general, the electric field due to the applied voltage (E=V/d) must be very high in order to induce even a small change in the index since the electro-optical coefficient is small, typically between $10^{-10}$ and $10^{-12}$ m/V, but can be as large as $10^{-9}$ m/V. This usually demands very high voltages. However, since the filter layer thickness d is very small, on the order of a quarter wavelength, reasonable voltages can produce very high electric fields and thereby change the refractive index a significant amount. The limitation in the change of n is determined by the electrical breakdown of the material. In addition, it is possible that high electric fields will cause nonlinear behavior, so that the index may not be accurately modeled by the above equation.

By using uniaxial electro-optical materials, the device may be made polarization independent as well. Each dielectric coating 204 in the color modulator 200 should have the uniaxial material oriented along the optical axis of the color modulator 200. This allows full usage of illumination from an unpolarized light source.

There are many possible configurations for this electro-optical solid state color modulator. It may be used in both a transmissive or reflective mode of operation. One possible reflective configuration would be a complete 3-band color modulator consisting of 3 single-band electro-optical color filters. In the OFF state, each single-band EO filter reflects all 3 bands and thus keeps them in the optical path. In the ON state, the EO filters transmit one band while maintaining high reflectances in the other two bands. The light in the transmitted band is thus removed from the optical path, thereby being filtered out of the system. The mechanism for effecting this behavior is the following. The EO filters themselves have two items; and electro-optically active multi-layered thin film device (the invention described herein); and a static color filter. The static color filter is a filter that has high transmittances for wavelengths greater than the longest wavelength in the desired color band, and near-zero transmittances (high reflectances) for shorter wavelengths. In the OFF state, the EO multi-layered device behaves in a complementary fashion; wavelengths less than the shortest wavelength in the desired color band are transmitted, while longer wavelengths are reflected. The overall effect is a high reflectance in all the color bands, effectively passing all the colors to the next filter in the sequence. However, in the ON state, the cutoff wavelength of the EO device is shifted to a longer wavelength, thereby allowing a well-defined band of light to be transmitted through the device, effectively eliminating it out of the system. If three EO color filters are built with three different transmittance bands respectively, then any single color may be filtered by selectively eliminating the other colors.

Figure 2:
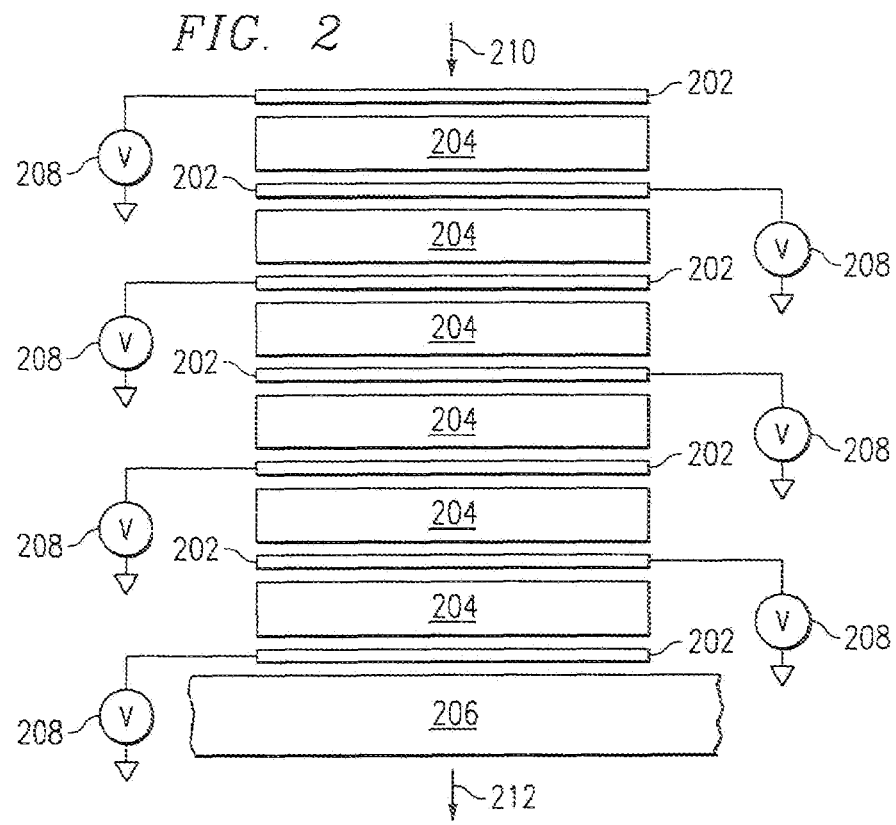
FIG. 2 is a schematic view showing one embodiment of the construction of the color modulator of FIG. 1.

FIG. 2 is a schematic view showing one embodiment of the construction of a color modulator 200 suitable for use as color modulator 106 in FIG. 1. Although the color modulator 200 shown is a transmissive color modulator, it is understood that the inventive concepts taught herein apply equally well to reflective color modulators.

In FIG. 2, alternating layers of electrodes 202 and dielectric coatings 204 are deposited on a glass substrate 206. The electrodes 202 are transparent electrodes, typically formed from Indium Tin Oxide.

The wavelengths that are reflected or transmitted depend on the thickness of each layer and the mismatch in the index of refraction between adjacent layers. By carefully selecting the material and thickness of each dielectric coating 204 selected wavelengths are reflected or transmitted. Furthermore, changing the index of refraction of the dielectric layers 204 changes the pass band of the color modulator. The refractive index of the electro-optic dielectric coatings is a function of the applied electric field. Therefore, the index of the material and the wavelengths reflected are changed by applying a voltage across the dielectric coatings 204.

Each dielectric coating 204 in the color modulator 200 is an optically active uniaxial material oriented along the optical axis of the color modulator 200. The dielectric material is ideally transparent in the desired wavelengths and has a high electro-optic coefficient and a high breakdown voltage. While any suitable dielectric material may be used, $LiNbO_3$, $LiTaO_3$, $NH_4H_2PO_4$, $KH_2PO_4$, and CdTe are the preferred crystal materials.

The refractive index of an optically active uniaxial material is given by:

$$n(E) = n - 1/2 rn^3 E$$

where r is the electro-optic coefficient of the dielectric material 204 and E is the applied electric field. Typical values for the electro-optic coefficient are around $10^{-12}$ to $10^{-10}$ m/V.

Because the electro-optic coefficient is so small, the electric field must be very large to induce even a small change in the index of refraction. Typical activation voltages for Pockels Cell modulators are several thousand volts. The required voltages can be lowered by depositing the dielectric material 204 in very thin layers because the applied electric field is equal to the voltage divided by the distance across the dielectric material.

The color modulator 200 taught herein envisions the use of very thin dielectric layers, typically a quarter-wave or a half-wave thick. These thin layers can be deposited using molecular beam epitaxy. The use of such thin layers allows the disclosed color modulator to be operated with a much lower voltage, typically around eight volts. For example, assuming a quarter-wave layer of a material with an electro-optical coefficient of $10^{-10}$ m/V is used, the voltage required to achieve a 0.1 change in the index of refraction at a wavelength of $555*10^{-9}$ m is:

$$V = (\Delta n * 2 * d)/r * n^3$$

$$8.1V = (0.1 * 2 * (555 * 10^{-9}/4))/((10 * 10^{-10} \text{ m/V}) * (1.5^3))$$

Although an eight volt bias applied across one layer of the dielectric material 204 only changes the index of refraction by about 0.1, such a small change in the index is sufficient to form a multilayer dichroic filter—in fact, a 0.1 change is about as large an impedance mismatch allowed in a typical stacked-layer optical filter.

Several layers are used to create the color modulator. The pass band of the color modulator is determined by the number of layers used and their characteristics. The disclosed color modulator ideally is used in applications that require fairly narrow, on the order of 10 nm, pass bands. A narrow band color modulator can be fabricated using five to ten dielectric layers 204. Wider pass bands are possible, but require additional layers.

The combination of the layer characteristics and the bias applied to the layers determines the wavelengths of light the color modulator passes—or reflects in the case of a reflective color modulator. The color modulator can be constructed in several ways. For example, the color modulator may have several independent sets of layers in which each set fabricated to control a range of wavelengths representing one of the three primary colors. By enabling one of the three sets of layers, the color associated with that set is allowed to pass through the color modulator. Alternatively, the entire stack of dielectric layers is used to generate each of the three primary colors by applying a unique the set of bias voltages to create each of the three primary color bands.

The bias applied to the dielectric layers depends on the interconnection of the electrode layers. The color modulator shown in FIG. 2 includes six dielectric layers 204 sandwiched between seven electrode layers 202. The electrodes 202 are all connected to independent voltage sources 208. The use of seven independent voltage sources 208 allows complete control over the electric field applied to each layer of the dielectric material.

Figure 3:
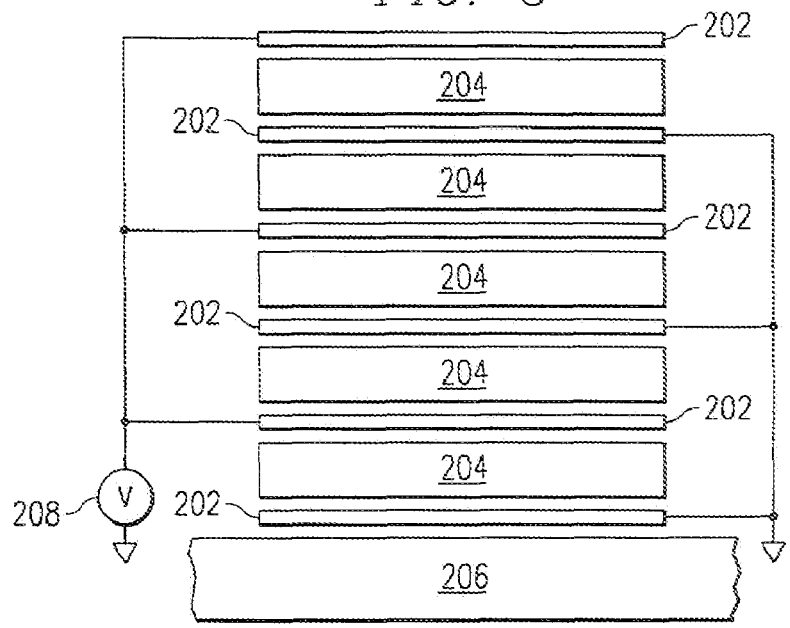
FIG. 3 is a schematic view showing another embodiment of the construction of the color modulator of FIG. 1.

An alternate embodiment is shown in FIG. 3. In FIG. 3, five layers of dielectric material 204 are sandwiched between six transparent electrodes 202. Three of the electrodes are connected to ground, while the other three are connected to a single voltage source 208. While the embodiment of FIG. 3 requires less voltage sources, it does not allow independent control over the transparent electrodes 202.

The disclosed color modulator does not rely on the polarization of the incident light. In FIG. 2, the incident light following light path 210 may have any polarization in the x-y plane—that is any polarization parallel to the dielectric layers 204. The filtered light beam is shown exiting the stack along path 212. The electric field is applied to the layers in the direction of the light paths. If desired, the light path could be reversed to allow the incident light to pass through the substrate 206 before reaching the stack of dielectric layers 204.

The color modulator is integrated into the display system in several ways. Referring back to FIG. 1, the color modulator is shown in two locations. First, the color modulator 106 is an independent element, typically in the illumination path before the light beam reaches the spatial light modulator 112. Alternatively, the color modulator is fabricated on one of the other optical components. For example, the color modulator 106 could be replaced by a color modulator 130 deposited on one of the faces of a prism.

Figure 4:
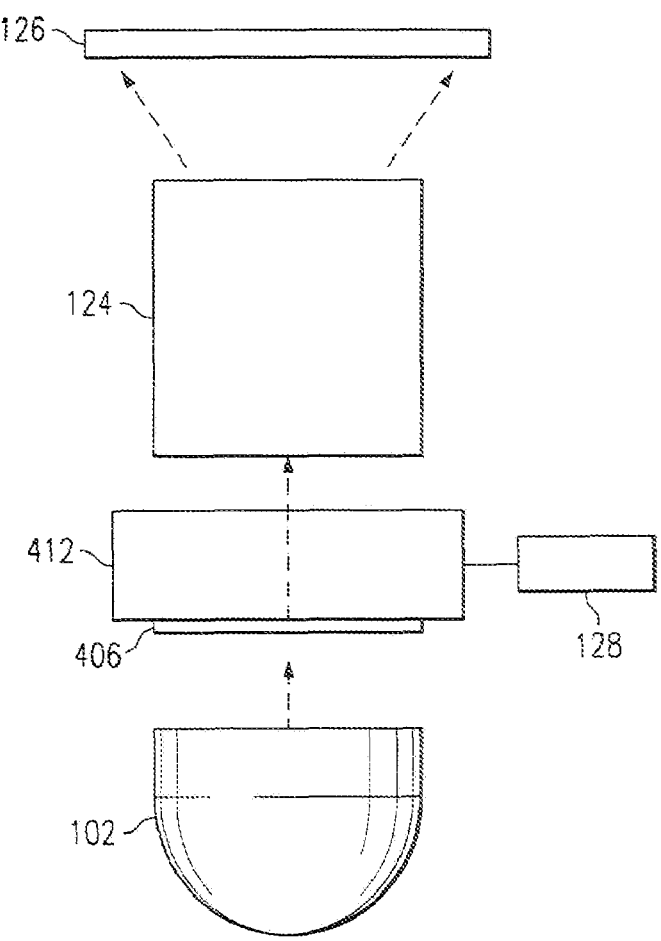
FIG. 4 is a schematic view of a single-modulator display system using a color modulator according to the present invention in combination with a transmissive spatial light modulator.

FIG. 4 shows another alternate embodiment for the color modulator 406. In FIG. 4, the color modulator 406 is fabricated on one of the substrates used to form a transmissive liquid crystal device (LCD) 412. By fabricating the color modulator 406 on the LCD 412, the color modulation and light valve functions are combined in a single device, saving space and reducing the optical alignment necessary to fabricate the system.

Thus, although there has been disclosed to this point a particular embodiment for a color modulator for use in a projection display system, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A color display system comprising:
   a light source for providing a beam of white light along a light path;
   at least one color modulator on said light path, said color modulator comprised of a stack of at least two dielectric layers and at least three transparent electrode layers, wherein a voltage applied to said electrodes limits the wavelengths of light permitted to continue on said light path;
   a controller;
   a spatial light modulator on said light path, said spatial light modulator operable to selectively modulate incident light in response to signals from said controller; and
   projection optics on said light path operable to focus light from said spatial light modulator on an image plane.

2. The display system of claim 1, further comprising a prism assembly for spatially separating an illumination segment of said light path from a projection segment of said light path, said spatial light modulator located at a junction between said illumination segment and said projection segment.

3. The display system of claim 2, wherein said color modulator is fabricated on a face of said prism assembly.

4. The display system of claim 1, wherein said color modulator is fabricated on said spatial light modulator.

5. The display system of claim 1, wherein said spatial light modulator is a deformable mirror device.

6. The display system of claim 1, wherein said spatial light modulator is a liquid crystal device.

7. A method of creating a full-color image, the method comprising the steps of:
   providing a beam of white light;
   filtering said beam of white light to produce a primary color beam of light, said filtering step performed by passing said beam of white light through a stack of at least two dielectric layers, at least one of said dielectric layers exposed to an electric field;
   selectively modulating portions of said primary color beam of light to produce an image-bearing beam of light; and
   focusing said image-bearing beam of light on an image plane; and
   altering electrical signals biasing said stack of dielectric layers such that said primary color beam of light alternates between at least three colors.

* * * * *